US009961567B2

(12) United States Patent
Sato

(10) Patent No.: US 9,961,567 B2
(45) Date of Patent: May 1, 2018

(54) WIRELESS COMMUNICATION DEVICE, INFORMATION COMMUNICATION TERMINAL, COMMUNICATION SYSTEM CONTROL METHOD, AND CONTROL PROGRAM

(71) Applicant: NEC Platforms, Ltd., Kanagawa (JP)

(72) Inventor: Kensuke Sato, Kanagawa (JP)

(73) Assignee: NEC PLATFORMS, LTD., Kanagawa (JP)

(*) Notice: Subject to any disclaimer, the term of this patent is extended or adjusted under 35 U.S.C. 154(b) by 62 days.

(21) Appl. No.: 14/601,836

(22) Filed: Jan. 21, 2015

(65) Prior Publication Data

US 2015/0208449 A1 Jul. 23, 2015

(30) Foreign Application Priority Data

Jan. 21, 2014 (JP) .................. 2014-008693

(51) Int. Cl.
*H04W 24/02* (2009.01)
(52) U.S. Cl.
CPC .................. *H04W 24/02* (2013.01)
(58) Field of Classification Search
None
See application file for complete search history.

(56) References Cited

U.S. PATENT DOCUMENTS

| 5,705,994 A | 1/1998 | Nakayama et al. | |
| 2010/0039960 A1 | 2/2010 | Sugaya | |
| 2010/0066839 A1* | 3/2010 | Azuma | G11B 27/034 348/207.1 |
| 2010/0124213 A1* | 5/2010 | Ise | H04W 12/06 370/338 |
| 2012/0072976 A1* | 3/2012 | Patil | H04W 12/06 726/6 |
| 2012/0113892 A1* | 5/2012 | Luetschwager | H04W 48/16 370/328 |

(Continued)

FOREIGN PATENT DOCUMENTS

| JP | H8-265817 | 10/1996 |
| JP | 2009-89003 | 4/2009 |

(Continued)

OTHER PUBLICATIONS

Japanese Office Action dated May 10, 2016 in corresponding Japanese Patent Application No. 2014-008693 with partial English translation of Japanese Office Action.

(Continued)

*Primary Examiner* — Joseph A Bednash
(74) *Attorney, Agent, or Firm* — Young & Thompson

(57) ABSTRACT

A wireless communication device according to the present invention includes a storage unit, a delivery unit, and a control unit. The storage unit holds identification information indicating the wireless communication device, and related information related to the identification information. The delivery unit delivers the identification information and the related information in such a manner that the identification information and the related information are included in a wireless beacon. The control unit establishes a wireless communication upon acquisition of a connection request signal based on the delivered identification information.

9 Claims, 14 Drawing Sheets

(56) References Cited

U.S. PATENT DOCUMENTS

| | | | | |
|---|---|---|---|---|
| 2012/0314636 A1* | 12/2012 | Liu | ................... | H04W 28/065 370/311 |
| 2013/0086644 A1* | 4/2013 | Bahn | ................. | H04L 12/2818 726/4 |
| 2014/0105097 A1* | 4/2014 | Liu | ....................... | H04W 4/06 370/312 |
| 2015/0172889 A1 | 6/2015 | Nakao | | |

FOREIGN PATENT DOCUMENTS

| | | |
|---|---|---|
| JP | 2009-89004 | 4/2009 |
| JP | 2009-89005 | 4/2009 |
| JP | 2010-45659 | 2/2010 |
| WO | WO01/056244 | 8/2001 |
| WO | 2006-134510 | 12/2006 |
| WO | 2013/183645 | 12/2013 |

OTHER PUBLICATIONS

JP OA dated Oct. 27, 2015; Application No. 2014-008693.

* cited by examiner

| MANUFACTURER -SPECIFIC INFORMATION | OUI INFORMATION | OTHER INFORMATION | IDENTIFIER (ID) | FLAG INFORMATION | OFFSET INFORMATION | DIVIDED DATA | CATEGORY INFORMATION |
|---|---|---|---|---|---|---|---|
| 301 | 302 | 303 | 304 | 305 | 306 | 307 | 308 |

WIRELESS COMMUNICATION DEVICE, INFORMATION COMMUNICATION TERMINAL, COMMUNICATION SYSTEM CONTROL METHOD, AND CONTROL PROGRAM

INCORPORATION BY REFERENCE

This application is based upon and claims the benefit of priority from Japanese patent application No. 2014-008693, filed on Jan. 21, 2014, the disclosure of which is incorporated herein in its entirety by reference.

BACKGROUND OF THE INVENTION

1. Technical Field

The present invention relates to a wireless communication device, an information communication terminal, a communication system control method, and a control program.

2. Background Art

In recent years, wireless terminals having a wireless LAN function, such as smartphones and tablet computers, have been in widespread use. Upon detecting connectable wireless LANs, a wireless terminal displays the SSIDs (Service Set Identifiers) of the detected wireless LANs on a screen. A user then selects the SSID of a desired wireless LAN, and connects the wireless terminal to the selected wireless LAN.

International Patent Publication No. WO 2001/056244 discloses a data transmission method for dividing one moving image data file into a plurality of divisional delivery data files and transmitting the divided divisional delivery data files to different transmission paths. In the data transmission method, the plurality of received divisional delivery data files are combined and restored to one moving image data file.

Along with the recent popularization of wireless terminals, the number of public wireless LAN access points has been increased. Accordingly, when a wireless terminal tries to detect a connectable wireless LAN in a city, the wireless terminal can detect a number of connectable wireless LANs. At this time, the wireless terminal displays a number of SSIDs of wireless LANs, thereby notifying the user that a number of wireless LANs have been detected. However, the SSID consists of a character string, such as alphanumeric characters. Therefore, when a plurality of similar SSIDs are displayed, the visibility is poor and it is thus difficult to identify the wireless LANs. This results in a problem that the user might erroneously select the wrong wireless LAN.

SUMMARY

The present invention has been made to solve the above-mentioned problem, and an object of the present invention is to provide a communication system, a wireless LAN access point, a communication system control method, and a control program which are capable of easily identifying a wireless LAN.

A first exemplary aspect of the present invention is a wireless communication device including: a storage unit that holds identification information indicating the wireless communication device, and related information related to the identification information; a delivery unit that delivers the identification information and the related information in such a manner that the identification information and the related information are included in a wireless beacon; and a control unit that establishes a wireless communication upon acquisition of a connection request signal based on the delivered identification information.

A second exemplary aspect of the present invention is an information communication terminal including: a storage unit that holds identification information indicating a wireless communication device, and related information related to the identification information, upon acquisition of the identification information and the related information; an output unit that outputs the related information; and a control unit that establishes a wireless communication based on the identification information, and causes the output unit to output the related information.

A third exemplary aspect of the present invention is a method for controlling a communication system, the communication system including: a wireless communication device including a storage unit that holds identification information indicating the wireless communication device, and related information related to the identification information; and an information communication terminal capable of establishing a wireless communication with the wireless communication device, the method including: delivering, by the wireless communication device, the identification information and the related information in such a manner that the identification information and the related information are included in a wireless beacon; and establishing, by the wireless communication device, a wireless communication with the information communication terminal, upon acquisition of a connection request signal based on the delivered identification information from the information communication terminal.

A fourth exemplary aspect of the present invention is a non-transitory computer readable medium storing a control program for a communication system, the communication system including: a wireless communication device including a storage unit that holds identification information indicating the wireless communication device, and related information related to the identification information; and an information communication terminal capable of establishing a wireless communication with the wireless communication device, the control program causing a computer to execute processing including: causing the wireless communication device to deliver the identification information and the related information in such a manner that the identification information and the related information are included in a wireless beacon; and causing the wireless communication device to establish a wireless communication with the information communication terminal, upon acquisition of a connection request signal based on the identification information from the information communication terminal, the identification information being delivered by the wireless communication device.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 12 is a diagram showing a configuration of a frame body according to a second modified example of the first exemplary embodiment;

EXEMPLARY EMBODIMENTS

First Exemplary Embodiment

Figure 1:
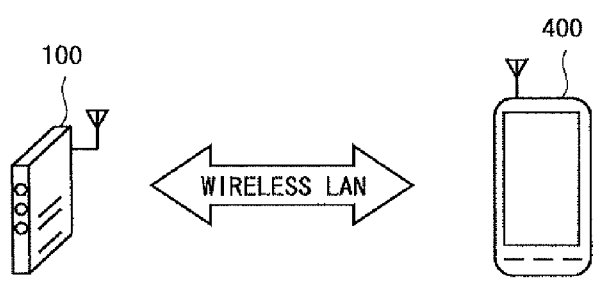
FIG. 1 is a diagram showing a configuration of a communication system according to a first exemplary embodiment.

A first exemplary embodiment of the present invention will be described below with reference to the drawings. FIG. 1 is a diagram showing a configuration of a communication system 1 according to the first exemplary embodiment. The communication system 1 includes a wireless LAN access point 100 and a wireless terminal 400. The wireless LAN access point 100 and the wireless terminal 400 are connected via a wireless LAN (Local Area Network). The wireless LAN access point 100 is, for example, a relay device such as a public wireless LAN access point or a home gateway. The wireless terminal 400 is, for example, a terminal capable of performing wireless LAN communication, such as a mobile phone, a smartphone, a tablet PC (Personal Computer), a notebook PC, a game console, or a music player.

<Configuration of the Wireless LAN Access Point 100>

Figure 2:
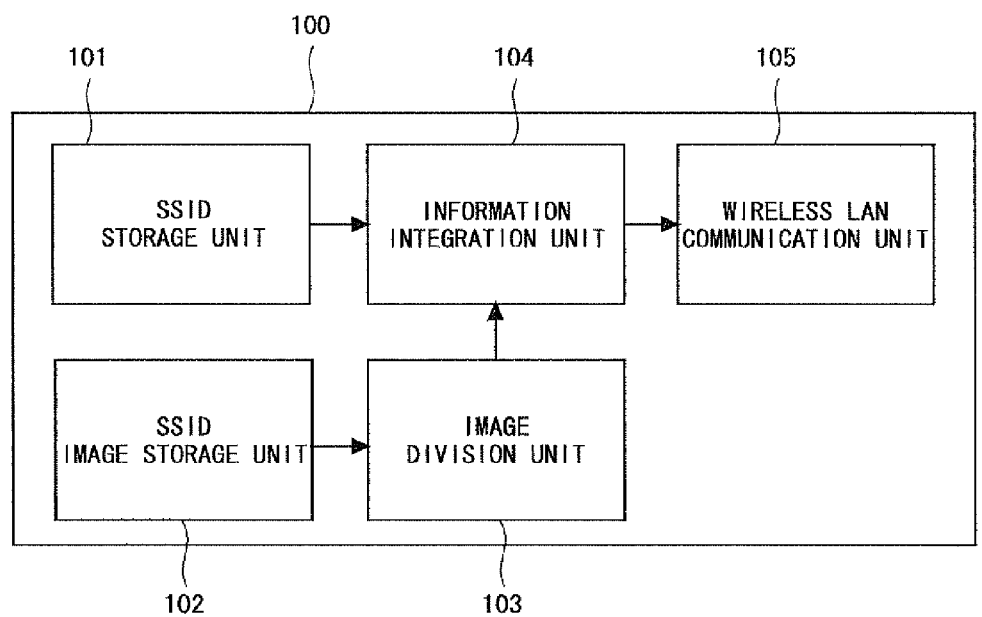
FIG. 2 is a block diagram showing a wireless LAN access point according to the first exemplary embodiment.

First, the configuration of the wireless LAN access point 100 (wireless communication device) will be described. FIG. 2 is a block diagram showing the wireless LAN access point 100. The wireless LAN access point 100 includes an SSID (Service Set Identifier) storage unit 101, an SSID image storage unit 102, an image division unit 103, an information integration unit 104, and a wireless LAN communication unit 105.

The SSID storage unit 101 (storage unit) is, for example, a memory such as a RAM (Random Access Memory) or a ROM (Read Only Memory). The SSID storage unit 101 stores SSID (identification information) which is identification information on the wireless LAN through which the wireless LAN access point 100 performs communication. In other words, the identification information is information for identifying the wireless LAN access point 100 (or a wireless LAN for the wireless LAN access point 100). When the wireless LAN access point 100 has a multiple SSID function, the SSID storage unit 101 may store a plurality of SSIDs.

The SSID image storage unit 102 (storage unit) is, for example, a memory such as a RAM or a ROM. The SSID image storage unit 102 stores image data (related information) related to the SSID. The image data related to the SSID is SSID-specific image data stored in the SSID storage unit 101 and is preset image data.

The image data related to the SSID is hereinafter referred to as SSID image data (related information). The SSID and the SSID image data are not necessarily in one-to-one correspondence. For example, in the wireless LAN access point 100 having the multiple SSID function, one piece of image data may be associated with a plurality of SSIDs stored in the SSID storage unit 101. Additional information for associating the SSID with the SSID image is stored in the SSID storage unit 101 or the SSID image storage unit 102.

The image division unit 103 divides the SSID image data, which is stored in the SSID image storage unit 102, into a plurality of pieces of data. The pieces of divided data are hereinafter referred to as divided data. Specifically, the image division unit 103 converts the SSID image data into a plurality of pieces of divided data (partial information) each having a data size smaller than that of the SSID image data. In other words, the divided data is information that forms a part of the SSID image data. Further, the image division unit 103 stores the divided data in the frame body of a beacon transmitted from the wireless LAN access point 100.

The information integration unit 104 (control unit) integrates (adds) the SSID corresponding to the SSID image data, from which the divided data is obtained, into the frame body generated by the image division unit 103. Thus, the information integration unit 104 generates a beacon frame including the divided data and the SSID.

Figure 3:
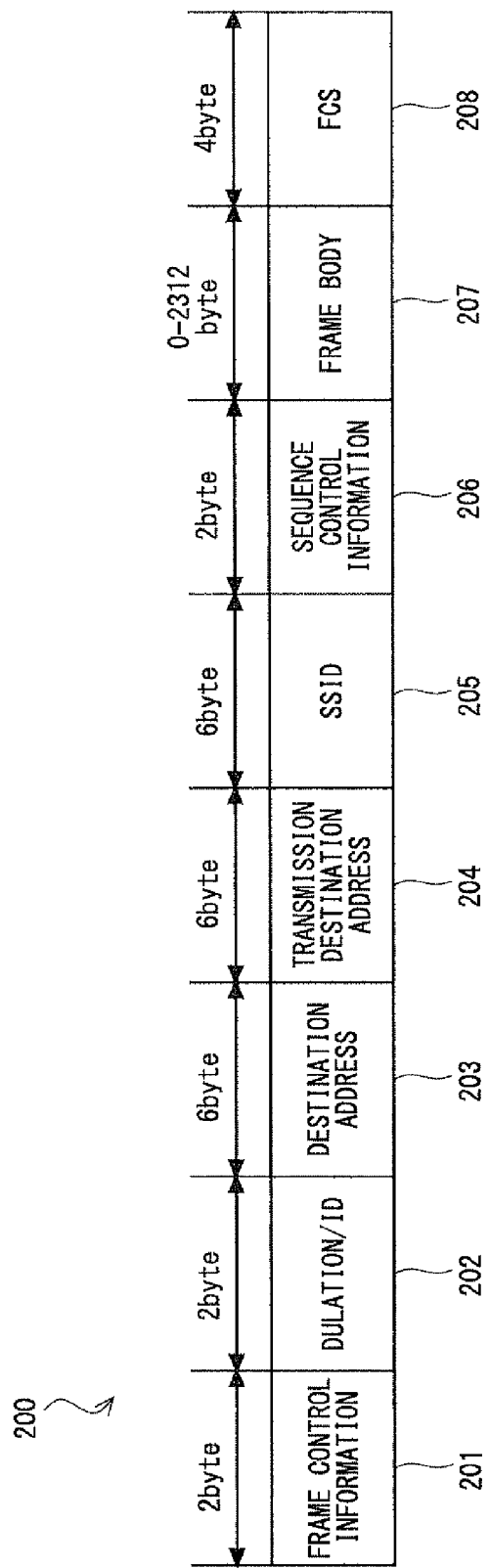
FIG. 3 is a diagram showing a configuration of a beacon frame according to the first exemplary embodiment.

The beacon frame (beacon information) generated by the information integration unit 104 will now be described in detail. FIG. 3 shows the configuration of a beacon frame 200. The beacon frame 200 includes frame control information 201, a duration ID 202, a destination address 203, a transmission destination address 204, an SSID 205, sequence control information 206, a frame body 207, and an FCS (Frame Check Sequence) 208.

The frame control information 201 includes, for example, the type of the frame, the destination of the frame, information indicating whether the transmission source of the frame is wireless or wired, and fragment information. The duration ID 202 includes, for example, information on a scheduled period of time in which radio waves are used (time required for transmitting the frame). The destination address 203 includes the MAC address of the destination. The transmission destination address 204 includes the MAC address of the transmission destination. The SSID 205 includes, for example, an ESSID and a BSSID (the MAC address of the wireless LAN access point 100). The sequence control information 206 includes information about, for example, the sequence number of data to be transmitted and the fragment number of data when the data is fragmented. The frame body 207 is data including the above-mentioned divided data. The frame body 207 will be described in detail later. The FCS 208 includes added data to check whether there is an error in the received frame. The capacity of each of the pieces of information (region) is shown in FIG. 3.

Figure 4:
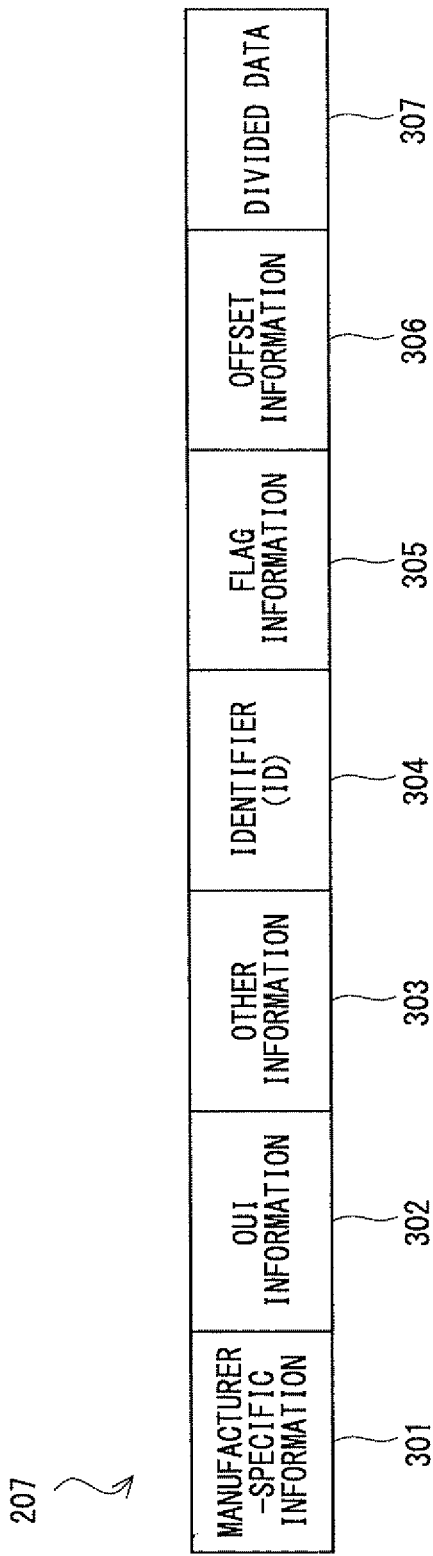
FIG. 4 is a diagram showing a configuration of a frame body according to the first exemplary embodiment.

FIG. 4 shows a detailed configuration of the frame body 207. The frame body 207 includes manufacturer-specific information 301, OUI (Organizationally Unique Identifier) information 302, other information 303, an identifier (ID) 304, flag information 305, offset information 306, and divided data 307.

The manufacturer-specific information 301 includes information specific to a manufacturer. The OUI information 302 corresponds to the first half of the MAC address, and includes information indicating a manufacturer. When images are divided from the same image, the same ID is assigned to the images, thereby enabling a wireless client to recognize that the divided images originate from the same image. The manufacturer-specific information 301 and the OUI information 302 also include information to recognize that the image data is necessary for the wireless terminal 400.

The identifier 304 includes an identifier specific to the image data. Specifically, when certain image data is divided and a plurality of pieces of divided data are generated, a common (same) identifier is assigned to these pieces of divided data. This enables the wireless terminal 400, which has received the divided data, to recognize that the plurality of pieces of divided data having a common identifier are the components of one piece of image data.

The flag information 305 is information (flag) indicating the presence or absence of subsequent divided data. In other words, the flag refers to information indicating whether there is any data subsequent to the divided data. As for the last divided data among the plurality of pieces of divided data that form one piece of SSID image data, the value of the flag indicates 0. This is because there are no divided data subsequent to the last divided data. On the other hand, as for the divided data other than the last divided data, the value of the flag indicates 1. This is because there are divided data subsequent to the divided data other than the last divided data. The wireless terminal 400 can recognize whether there are subsequent divided data, by referring to the flag.

The offset information 306 includes offset information which is information necessary for reconstructing the plurality of pieces of divided data into the original SSID image data. The offset information is information indicating, for example, the order of combining the pieces of divided data, and the positions of the pieces of divided data to be combined. A data size obtained when the data is divided into divided data can be used as the offset information. For example, image data having a data size of 4000 bytes is divided into four data segments each having a data size of 1000 bytes. In this case, the offset information on a first divided data segment (divided data segment (1)) indicates 0; the offset information on a second divided data segment (image data segment (2)) indicates 1001; the offset information on a third divided data segment (image data segment (3)) indicates 2001; and the offset information on a fourth divided data segment (image data segment (4)) indicates 3001.

As described above, the divided data 307 is data obtained by dividing the SSID image data. The image division unit 103 adjusts the division size of the divided data 307 in such a manner that the total size of the data included in the frame body 207 falls within 2312 bytes, which is said to be the maximum size of the frame body 207.

The wireless LAN communication unit 105 (delivery unit) is a communication module and a communication antenna for performing a wireless LAN communication. Modules mounted on existing wireless LAN access points or home gateways, for example, can be used as the communication module and the like. The wireless LAN communication unit 105 transmits, to the wireless terminal 400, the beacon frame 200, which is generated by the information integration unit 104, as a beacon signal (wireless beacon) via the wireless LAN. In other words, the wireless LAN communication unit 105 delivers the SSID and the SSID image data (divided data) in such a manner that the SSID and the SSID image data are included in the beacon signal. At this time, both the SSID and the divided data may be included in one beacon signal, or the SSID and the divided data may be included in a plurality of beacon signals. That is, the SSID and the divided data may be included in different beacon signals, as long as the SSID and the divided data are included in any of the plurality of beacon signals. Upon acquisition of a connection request signal based on the SSID from the wireless terminal 400, the wireless LAN communication unit 105 establishes a wireless LAN communication with the wireless terminal 400.

Figure 5:
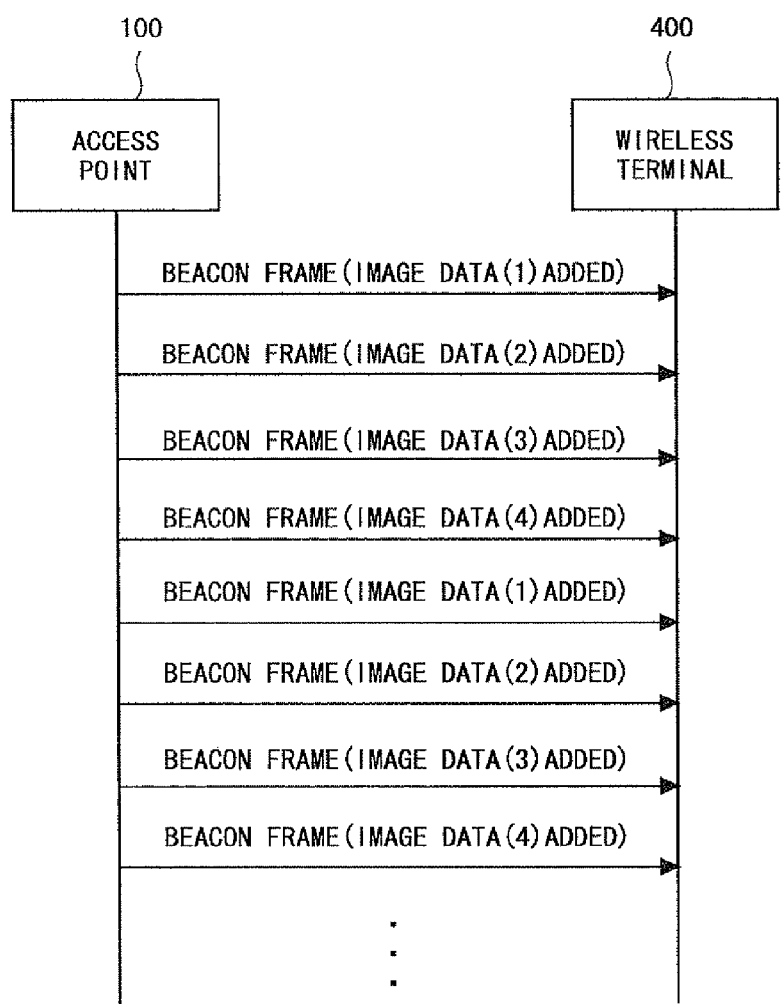
FIG. 5 is a sequence diagram for explaining a beacon transmission process according to the first exemplary embodiment.

The wireless LAN communication unit 105 can constantly transmit the beacon frames 200 to which the divided data is added, as long as wireless LAN communication is available as in a normal beacon frame. As in the above example, when there are four pieces of divided data, the divided data segments (1) to (4) are repeatedly transmitted. Specifically, as shown in FIG. 5, the wireless LAN communication unit 105 sequentially transmits the beacon frames 200 to which the divided data segments (1) to (4) are respectively added, and after that, repeatedly transmits the beacon frames 200 to which the divided data segments (1) to (4) are respectively added. That is, the wireless LAN communication unit 105 periodically transmits various types of beacon frames 200 to which different divided data segments are respectively added. In other words, the wireless LAN communication unit 105 sequentially transmits various types of beacon frames 200 one by one via one channel through which the beacon frames can be transmitted. To put it another way, the wireless LAN communication unit 105 does not transmit a plurality of beacon frames at one time (in parallel) via a plurality of channels.

<Configuration of the Wireless Terminal 400>

Figure 6:
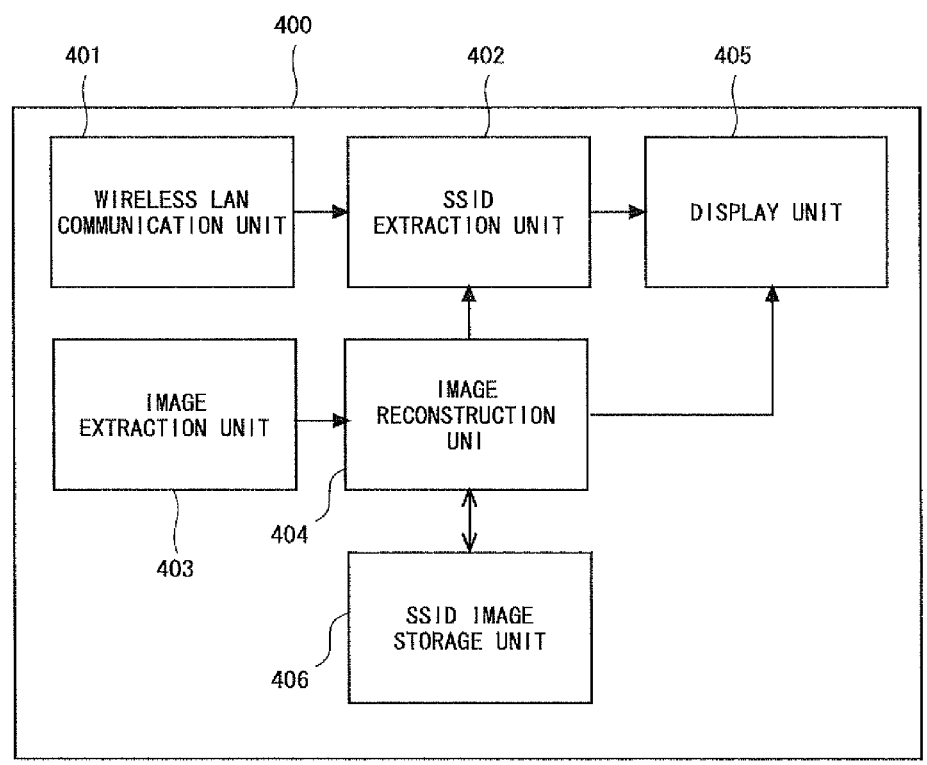
FIG. 6 is a block diagram showing a wireless terminal according to the first exemplary embodiment.

Next, the configuration of the wireless terminal 400 (information communication terminal) will be described. FIG. 6 is a block diagram showing the wireless terminal 400. The wireless terminal 400 includes a wireless LAN communication unit 401, an SSID extraction unit 402, an image extraction unit 403, an image reconstruction unit 404, a display unit 405, and an SSID image storage unit 406.

The wireless LAN communication unit 401 is a communication module and a communication antenna for performing a wireless LAN communication. Modules mounted on existing smartphones or notebook PCs, for example, can be used as the communication module and the like. The communication module and the like establish a wireless LAN communication based on the SSID. The wireless LAN communication unit 401 receives the beacon frame 200, to which the divided data is added, from the wireless LAN access point 100.

The SSID extraction unit 402 extracts the SSID from the beacon frame 200 received by the wireless LAN communication unit 401. Specifically, the SSID extraction unit 402 acquires the SSID 205 stored in the beacon frame 200. An existing function unit that recognizes the SSID from the beacon frame 200 can be used as the SSID extraction unit 402.

The image extraction unit 403 extracts the divided data from the beacon frame 200 received by the wireless LAN communication unit 401. Specifically, the image extraction unit 403 acquires the divided data 307 included in the frame body 207 of the beacon frame 200.

At this time, the image extraction unit 403 confirms the information included in the frame body 207. Specifically, the image extraction unit 403 confirms, in the frame body 207, the values of the manufacturer-specific information 301, the OUI information 302, and the other information 303. The image extraction unit 403 determines whether the confirmed information matches the values of the manufacturer-specific information 301, the OUI information 302, and the information 303, each of which is preliminarily stored in the image extraction unit 403. When they match each other, the image extraction unit 403 can recognize that the received beacon frame 200 is the beacon frame including the SSID and the SSID image data on the present invention.

After confirmation of the manufacturer-specific information 301, the OUI information 302, and the other information 303, the image extraction unit 403 confirms the identifier 304, the flag information 305, and the offset information 306. The image extraction unit 403 recognizes that the received divided data is partial data of one piece of SSID image data.

Based on the identifier 304, the flag information 305, and the offset information 306, the image reconstruction unit 404 (control unit) reconstructs the original SSID image data by using the divided data extracted by the image extraction unit 403. Specifically, the image reconstruction unit 404 confirms if a plurality of pieces of divided data extracted from a plurality of beacon frames 200 correspond to a part of the same SSID image data, by referring to the identifier 304. When the plurality of pieces of divided data have the same identifier 304, the image reconstruction unit 404 recognizes that these pieces of divided data originate from the same SSID image data. Further, the image reconstruction unit 404 confirms whether there are subsequent divided data, by referring to the flag information 305. When there are no subsequent divided data, the image reconstruction unit 404 determines that the reconstruction has been completed. Furthermore, the image reconstruction unit 404 recognizes which part (position) of the original SSID image data corresponds to the divided data, by referring to the offset information 306. The image reconstruction unit 404 then causes the display unit 405 to display the reconstructed SSID image data.

Figure 7:
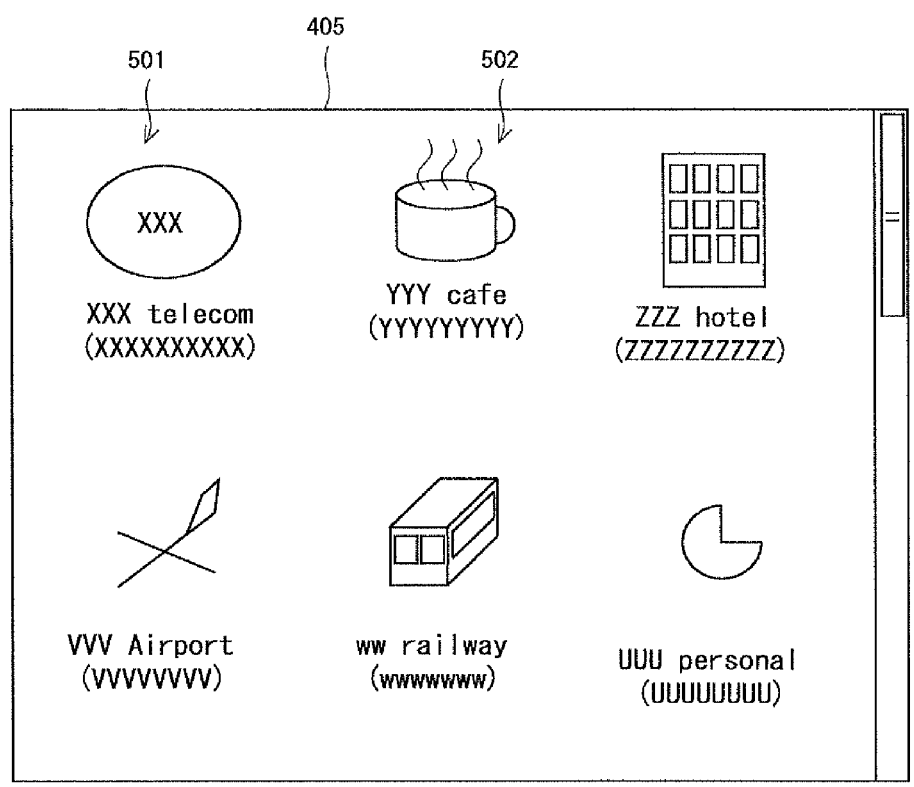
FIG. 7 is a display screen of a display unit of the wireless terminal according to the first exemplary embodiment.

The display unit 405 (output unit) combines and displays the SSID extracted by the SSID extraction unit 402 and the SSID image data reconstructed by the image reconstruction unit 404. The display unit 405 is a display device including a display, such as an LCD (Liquid Crystal Display) or an organic EL (Electro Luminescence) display. For example, as shown in FIG. 7, the SSID image data and the SSIDs are displayed on a screen of a wireless terminal, such as a PC, a TV, or a mobile terminal having a telephone function, such as a smartphone or a mobile phone.

Even when a part of the beacon frame 200 to which the divided data is added has not been received, the image reconstruction unit 404 carries out the image reconstruction operation by using only the received divided data. In this case, a part of the SSID image data is missing, and thus the display unit 405 displays the incomplete SSID image. As described above, the beacon frames 200 to which the divided data segments are respectively added are periodically transmitted. Accordingly, if the image reconstruction unit 404 receives, after the reconstruction, the beacon frame 200 which has not been received, the image reconstruction unit 404 reconstructs the SSID image data again. Then the display unit 405 displays the newly constructed image. Thus, even when the SSID image is partially missing, the wireless terminal 400 causes the display unit 405 to sequentially display the incomplete SSID image, and repeatedly performs the image reconstruction operation and the image display operation until the SSID image is completed.

The SSID image storage unit 406 (storage unit) holds the SSID and SSID image data which are included in the beacon signal received by the wireless LAN communication unit 401.

Figure 8:
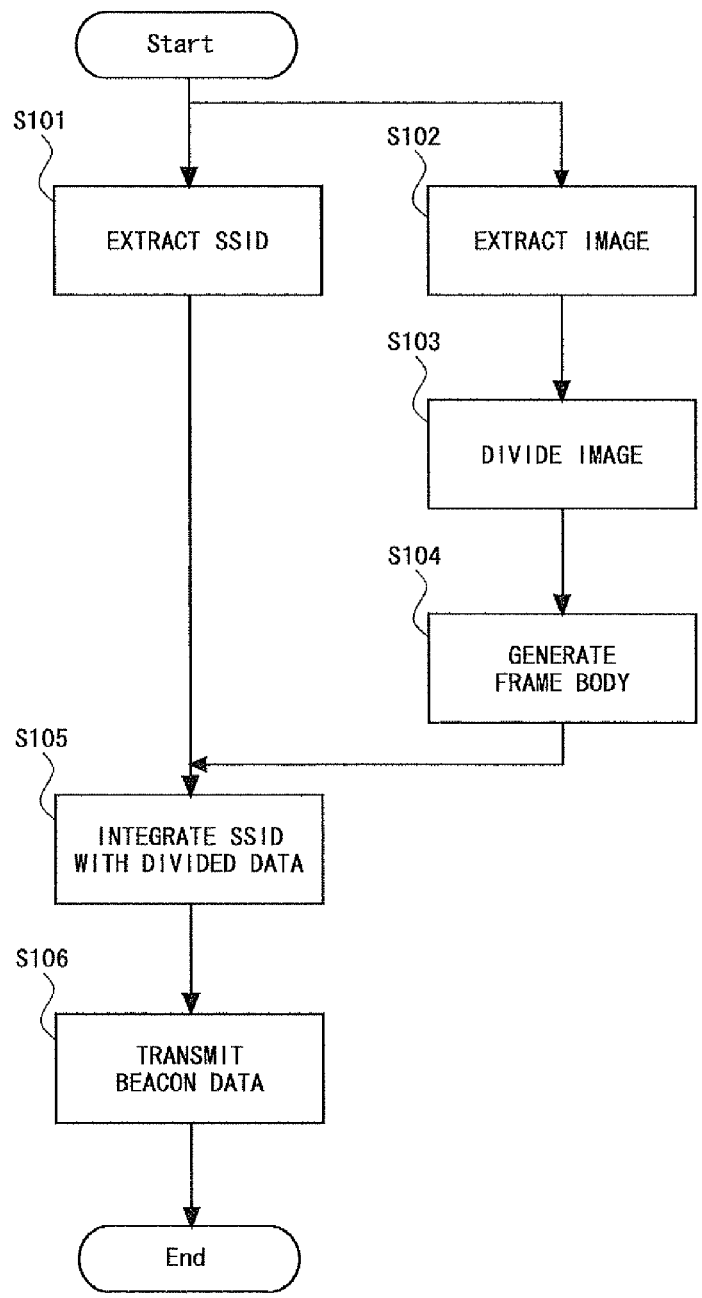
FIG. 8 is a flowchart showing an operation of the wireless LAN access point according to the first exemplary embodiment.
Figure 9:
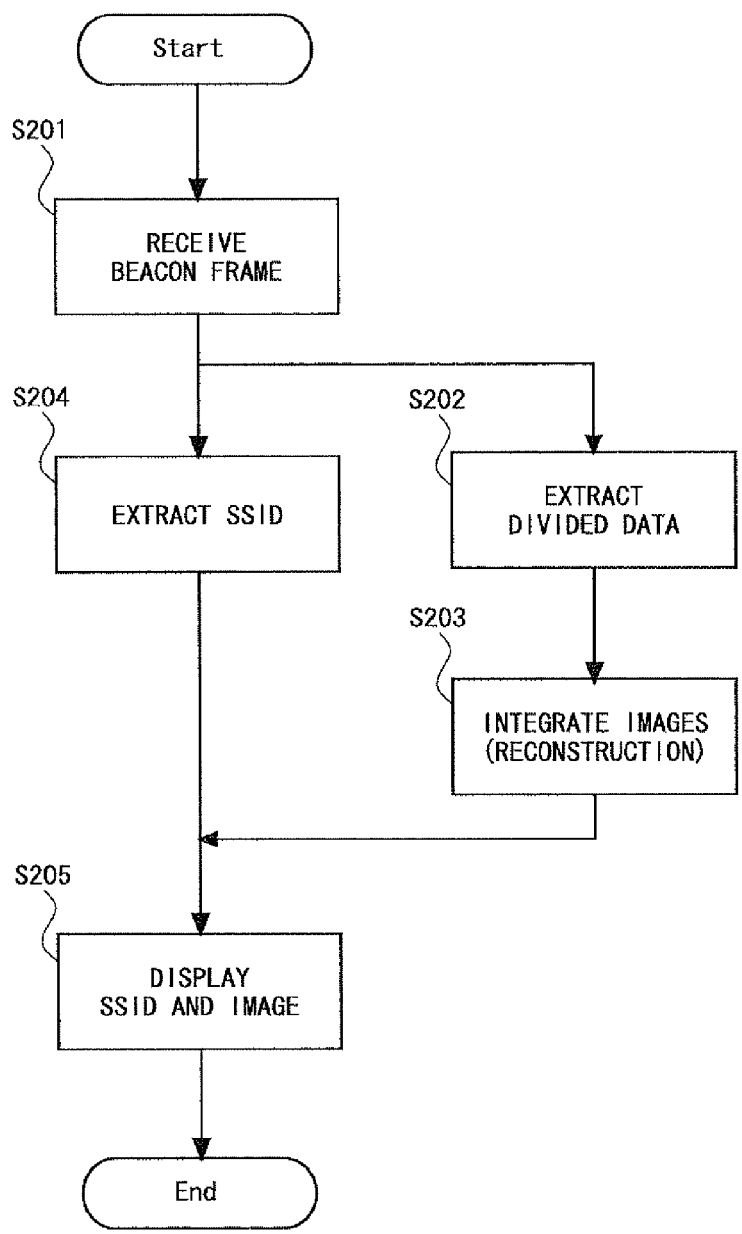
FIG. 9 is a flowchart showing an operation of the wireless terminal according to the first exemplary embodiment.

Next, the operation of the communication system 1 according to the first exemplary embodiment will be described with reference to the flowcharts of FIGS. 8 and 9. FIG. 8 is a flowchart showing the operation of the wireless LAN access point 100. FIG. 9 is a flowchart showing the operation of the wireless terminal 400.

<Operation of the Wireless LAN Access Point 100>

The operation of the wireless LAN access point 100 will now be described. First, the information integration unit 104 extracts the SSID stored in the SSID storage unit 101 (step S101). In parallel with this process, the image division unit 103 extracts the SSID image data stored in the SSID image storage unit 102 (step S102). Further, the image division unit 103 divides the SSID image data into data segments each having a predetermined data size (step S103). As a result, a plurality of pieces of divided data are generated.

The image division unit 103 generates the frame body 207 by using the divided data (step S104). Specifically, as shown in FIG. 4, the image division unit 103 adds the identifier 304, the flag information 305, the offset information 306, and the like to the divided data 307, thereby generating the frame body 207. A number of frame bodies 207 corresponding to the number of pieces of divided data are generated. For example, when the SSID image data is divided into four divided data segments, four frame bodies respectively including the divided data segments are generated. The image division unit 103 outputs the generated frame bodies to the information integration unit 104.

Next, the information integration unit 104 integrates the SSID with the divided data (step S105). Specifically, as shown in FIG. 3, the information integration unit 104 stores, in the beacon frame 200, the SSID extracted in step S101 and the frame body generated in step S104. Thus, the beacon frame including the SSID and the divided data of the SSID image data corresponding to the SSID is generated. The information integration unit 104 outputs the generated beacon frame to the wireless LAN communication unit 105.

The wireless LAN communication unit 105 transmits the beacon frame generated by the information integration unit 104 (step S106). The wireless LAN communication unit 105 periodically transmits various types of beacon frames depending on the type of the divided data (see FIG. 5). Upon receiving the connection request signal from the wireless terminal 400 which has received the beacon frame, the wireless LAN communication unit 401 establishes a wireless communication with the wireless terminal 400.

<Operation of the Wireless Terminal 400>

Next, the operation of the wireless terminal 400 will be described. First, the wireless LAN communication unit 401 receives the beacon frame transmitted from the wireless LAN access point 100 (step S201). Next, the SSID extraction unit 402 extracts the SSID from the beacon frame (step S204). In parallel with this process, the image extraction unit 403 extracts the divided data included in the frame body of the beacon frame (step S202).

The image reconstruction unit 404 reconstructs the SSID image data by using the plurality of pieces of divided data extracted by the image extraction unit 403 (step S203). Specifically, the image reconstruction unit 404 integrates the pieces of divided data based on the identifier 304, the flag information 305, and the offset information 306, thereby reconstructing the SSID image data. Thus, the SSID image data is generated in the wireless terminal 400. The image reconstruction unit 404 outputs the reconstructed SSID image data to the display unit 405.

The display unit 405 then displays the SSID and the reconstructed SSID image (step S205). As shown in FIG. 7, the SSID (character strings, such as "XXXXXXXXXX" and "YYYYYYYYY", in parentheses) and SSID-specific SSID images 501 and 502 are displayed on the display unit 405 of the wireless terminal 400. As shown in FIG. 7, each SSID image is an image including a mark, a name, and the like which indicate a facility that provides the wireless LAN of the SSID (i.e., a facility in which the wireless LAN access point 100 is installed). When the SSID to be connected is selected by a user, the wireless LAN communication unit 401 transmits the connection request signal to the wireless LAN access point 100.

Figure 10:
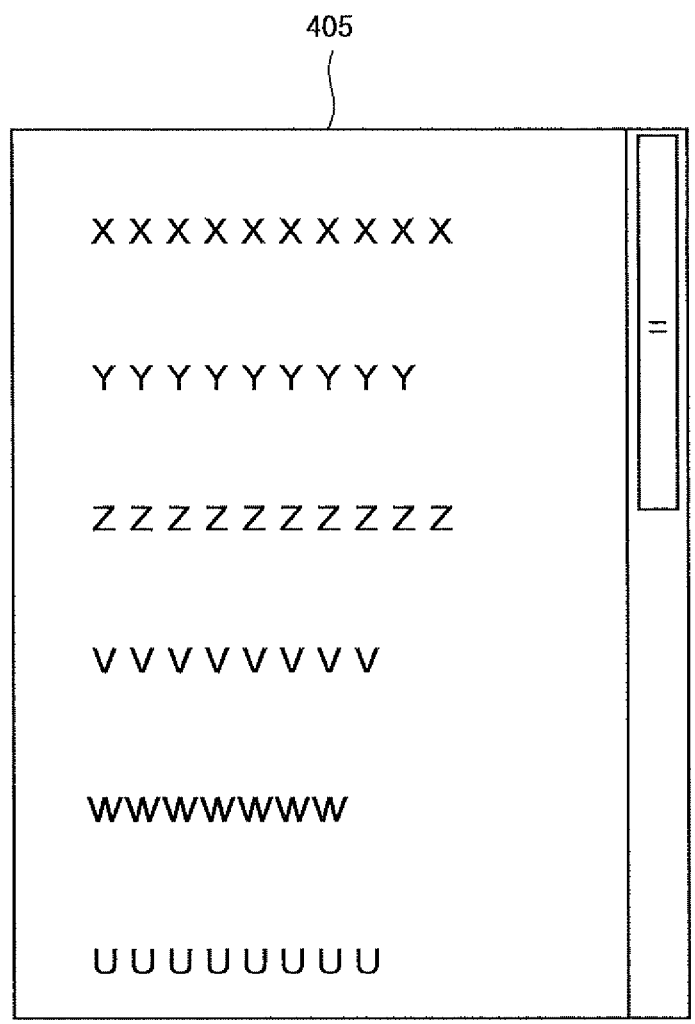
FIG. 10 is a diagram showing a display screen of a display unit of a wireless terminal according to a comparative example.

A display mode for displaying the SSID in a communication system according to a comparative example will now be described. The wireless LAN access point according to the comparative example does not transmit the SSID image data, and transmits only the character string data of the SSID. Accordingly, as shown in FIG. 10, in the communication system according to the comparative example, only the character string indicating the SSID is displayed on the display unit 405. Therefore, the user needs to identify the wireless LAN (wireless LAN access point) based only on the character string, which makes it difficult for the user to identify the wireless LAN.

As described above, in the configuration of the communication system 1 according to the first exemplary embodiment, the wireless LAN access point 100 stores the SSID and the SSID-specific SSID image data. Further, the wireless LAN access point 100 transmits the SSID image data to the wireless terminal 400. The wireless terminal 400 displays the received SSID image data. Thus, the SSID images respectively corresponding to the SSIDs of connectable wireless LANs are displayed on the display unit 405 of the wireless terminal 400. This enables the user to intuitively recognize the information, such as the type of the wireless LAN access point, the company to which the wireless LAN access point belongs, and information indicating whether or not the wireless LAN access point is a commercial wireless LAN access point, by viewing the displayed images. Therefore, the visibility is enhanced as compared with the case where only the SSIDs, each of which is represented by a character string, and the wireless LAN (wireless LAN access point) can be easily identified. This prevents the user from erroneously connecting the wireless terminal to the wrong wireless LAN.

Further, the wireless LAN access point 100 divides the SSID image data into a plurality of pieces of divided data each having a data size smaller than that of the SSID image data. The wireless LAN access point 100 then stores the divided data in a beacon frame and transmits the beacon frame and the SSID to the wireless terminal 400. The wireless terminal 400 reconstructs the SSID image data in the wireless terminal 400 by using the divided data. Accordingly, even when the data size of the SSID image data is too large to be stored in the beacon frame, the SSID image data can be divided into data segments to be transmitted. Consequently, in the wireless terminal 400, the reconstructed SSID image can be displayed. Furthermore, since the divided data may be added to the existing beacon frame to be transmitted, it is not necessary to separately perform a wireless communication for transmitting the SSID image data.

First Modified Example

A first modified example of the first exemplary embodiment will be described. The SSID image storage unit 406 (storage unit) caches (stores) the SSID image data reconstructed by the image reconstruction unit 404.

Figure 11:
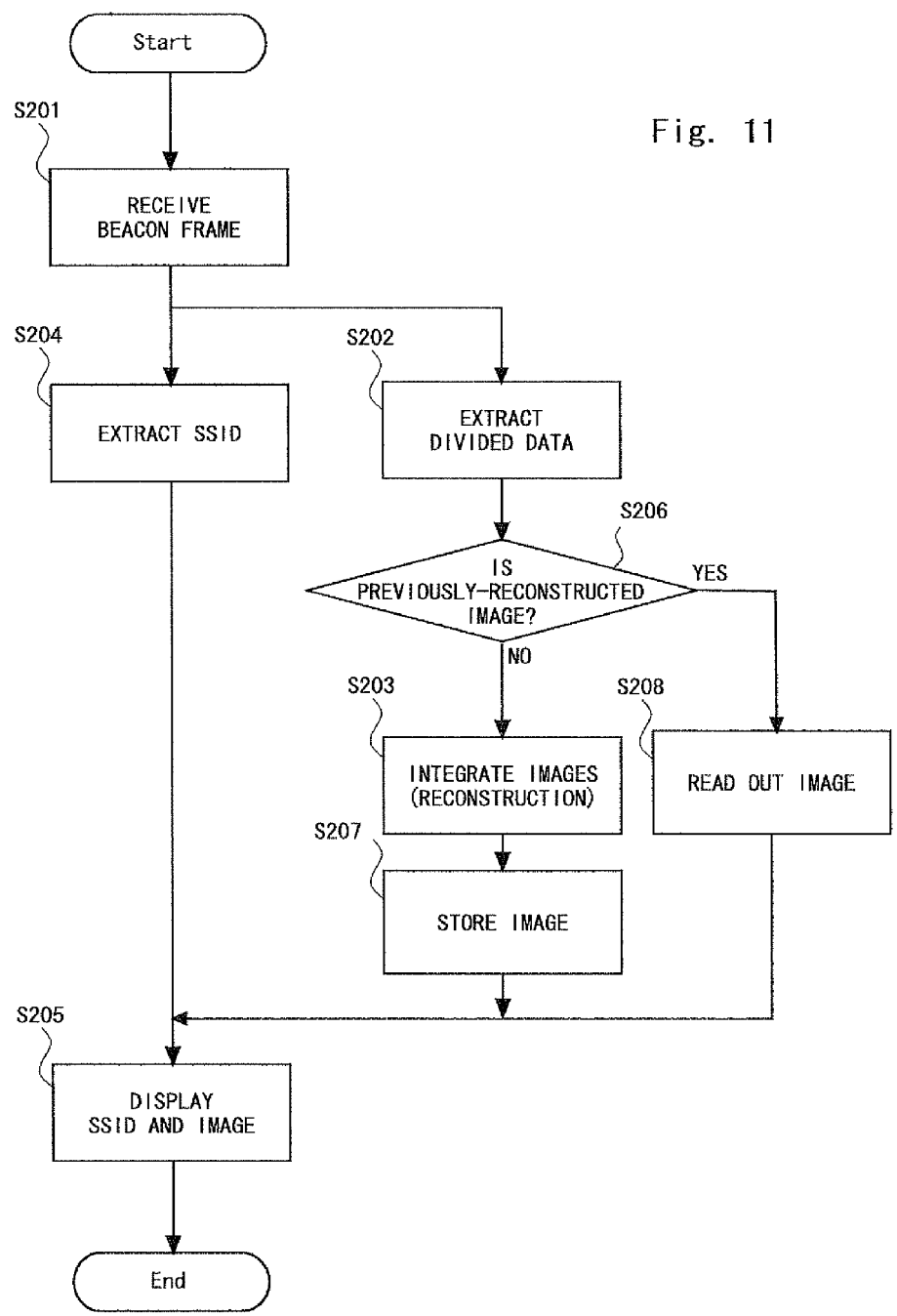
FIG. 11 is a flowchart showing an operation of a wireless terminal according to a first modified example of the first exemplary embodiment.

Next, the operation of the wireless terminal 400 according to the first modified example will be described with reference to the flowchart of FIG. 11. Note that steps S201 and S202 are similar to those in the flowchart of FIG. 9.

When the divided data, the identifier, and the like are extracted from the frame body, the image reconstruction unit 404 determines, prior to the reconstruction of the SSID image data, whether the SSID image data has been previously reconstructed or not, by referring to the identifier (step S206).

When the SSID image data has not been previously reconstructed by the image reconstruction unit 404 (step S206: No), the image reconstruction unit 404 reconstructs the SSID image data by using the divided data (step S203). Further, the image reconstruction unit 404 stores, in the SSID image storage unit 406, the reconstructed SSID image data and the identifier indicating the SSID image data in such a manner that the SSID image data and the identifier are associated with each other (step S207). After that, the display unit 405 displays the SSID and the SSID image (step S205).

On the other hand, when the SSID image data has been previously reconstructed by the image reconstruction unit 404 (step S206: Yes), the image reconstruction unit 404 refers to the identifier and reads out the SSID image data corresponding to the identifier from the SSID image storage unit 406, without reconstructing the SSID image data (step S208). The image reconstruction unit 404 then outputs the read SSID image data to the display unit 405. The display unit 405 displays the SSID and the SSID image read out from the SSID image storage unit 406 (step S205).

As described above, in the configuration of the wireless terminal 400 according to the first modified example, the image reconstruction unit 404 stores the reconstructed SSID image data in the SSID image storage unit 406. As for the SSID image data which has been previously reconstructed by the image reconstruction unit 404, the image reconstruction unit 404 reads out the SSID image data stored in the SSID image storage unit 406, without performing the reconstruction operation, and displays the SSID image data on the display unit 405. Accordingly, the processing load of the wireless terminal 400 can be reduced. Also, in an environment in which the radio wave condition is poor, if only a part of the beacon frame storing the divided data can be received, the previously-reconstructed SSID image data can be displayed on the display unit 405 even when all the divided data cannot be received. For this reason, the SSID images can be rapidly displayed.

While an identifier is used to determine whether the SSID image data has been previously reconstructed or not in the first exemplary embodiment, the SSID image data, such as the SSID, may be determined based on identifiable information.

Second Modified Example

A second modified example of the first exemplary embodiment will be described. FIG. 12 shows the configuration of the frame body 207 generated by the wireless LAN access point 100 according to the second modified example. The frame body 207 according to the second modified example stores category information 308 as well as the information shown in FIG. 4. The other information on the frame body 207 is similar to that shown in FIG. 4, and thus the description thereof is omitted as appropriate.

The category information 308 is information indicating the category, type, or the like of the wireless LAN (wireless LAN access point). The category information is, for example, information indicating whether the wireless LAN is for business use or private use, information indicating whether the wireless LAN is provided for free or for a fee, information indicating whether a password is required or not, or information indicating the business category of the store that provides the wireless LAN.

The display unit 405 of the wireless terminal 400 displays the SSID images for each category of the wireless LANs based on the category information 308. For example, when a wireless LAN for business use and a wireless LAN for private use are detected, the display unit 405 displays the SSID image corresponding to the wireless LAN for business use is displayed in the upper part of the display information, and displays the SSID image corresponding to the wireless LAN for private use below the SSID image for business use.

As described above, in the configuration of the communication system according to the second modified example, the wireless LAN access point 100 stores the divided data as well as the category information 308 in the beacon frame. Further, the display unit 405 of the wireless terminal 400 displays the SSID images for each category of the wireless LANs. This configuration enhances the visibility for users and facilitates the identification and selection of a wireless LAN, leading to an improvement in operability.

Second Exemplary Embodiment

Figure 13:
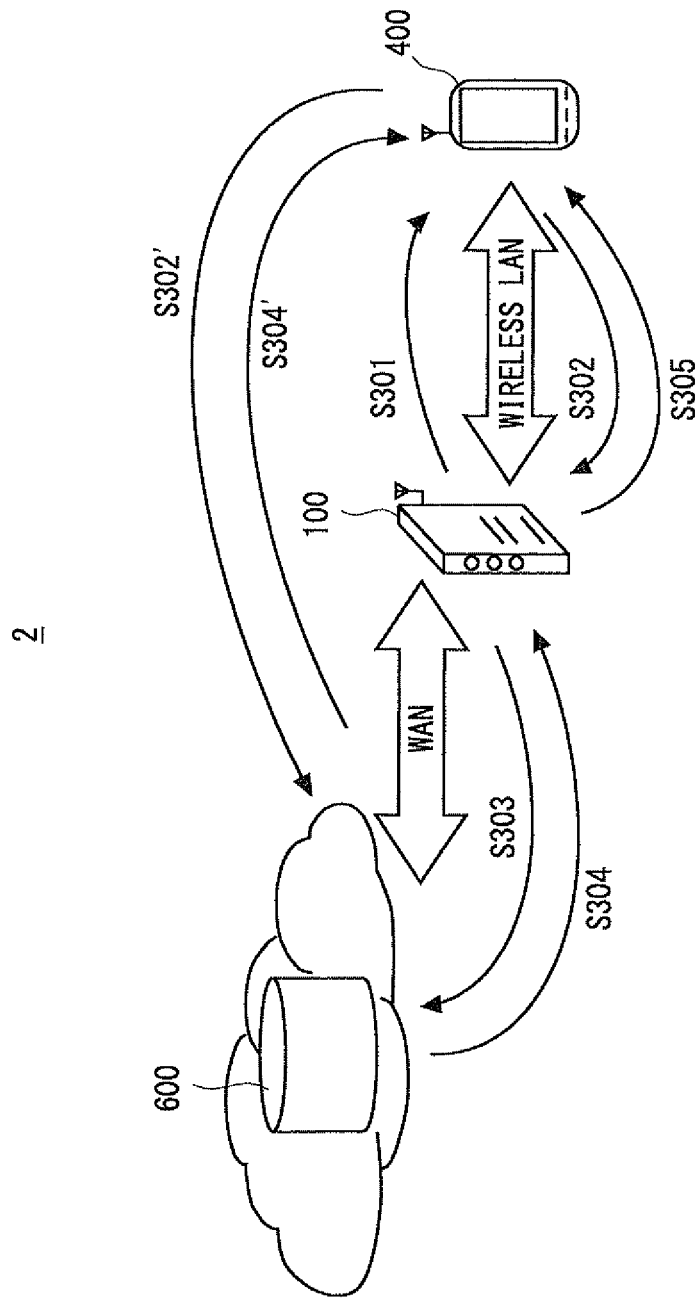
FIG. 13 is a diagram showing a configuration of a communication system according to a second exemplary embodiment.

A second exemplary embodiment of the present invention will be described. FIG. 13 shows a configuration of a communication system 2 according to the second exemplary embodiment. While the SSID image storage unit 102 of the wireless LAN access point 100 stores the SSID image data in the first exemplary embodiment described above, an external server 600 stores the SSID image data in the second exemplary embodiment. In the second exemplary embodiment, the SSID image data is not divided.

As shown in FIG. 13, the wireless LAN access point 100 is connectable to the wireless terminal 400 via a wireless LAN. Further, the wireless LAN access point 100 is connectable to the Internet via a wide area network (WAN). The external server 600 is a server existing on the Internet. The external server 600 is, for example, a storage device including an HDD (Hard Disk Drive) or the like.

The external server 600 stores the SSID image data in such a manner that the SSID image data is associated with the SSID. Further, the external server 600 stores the SSID image data and an image authentication ID in such a manner that the SSID image data and the image authentication ID are associated with each other. In other words, the SSID image data is associated with the SSID and the image authentication ID. The term "image authentication ID" herein used refers to an authentication ID necessary to download the SSID image data from the external server 600.

Note that the SSID image data, the SSID, and the image authentication ID are preliminarily registered in the external server 600 by a user. The form of the image authentication ID is not particularly limited and is, for example, ASCII. Assume that the image authentication ID is stored in an encrypted state, such as MD5.

Figure 14:
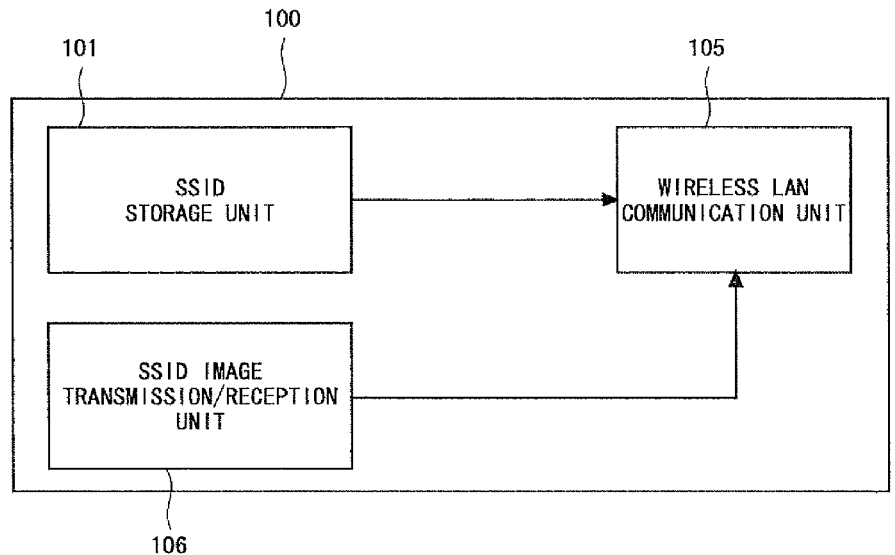
FIG. 14 is a block diagram showing a wireless LAN access point according to the second exemplary embodiment.

FIG. 14 is a block diagram showing the wireless LAN access point 100 according to the second exemplary embodiment. The wireless LAN access point 100 includes the SSID storage unit 101, the wireless LAN communication unit 105, and an SSID image transmission/reception unit 106. Since the configurations of the SSID storage unit 101 and the wireless LAN communication unit 105 are similar to those of the first exemplary embodiment, the description thereof is omitted. However, the SSID storage unit 101 also stores the image authentication ID in such a manner that the image authentication ID is associated with the SSID.

The SSID image transmission/reception unit 106 (transmission means) receives the SSID image data from the external server 600 via the WAN. Further, the SSID image transmission/reception unit 106 transmits the received SSID image data to the wireless terminal 400 by using a beacon frame, without dividing the SSID image data.

Figure 15:
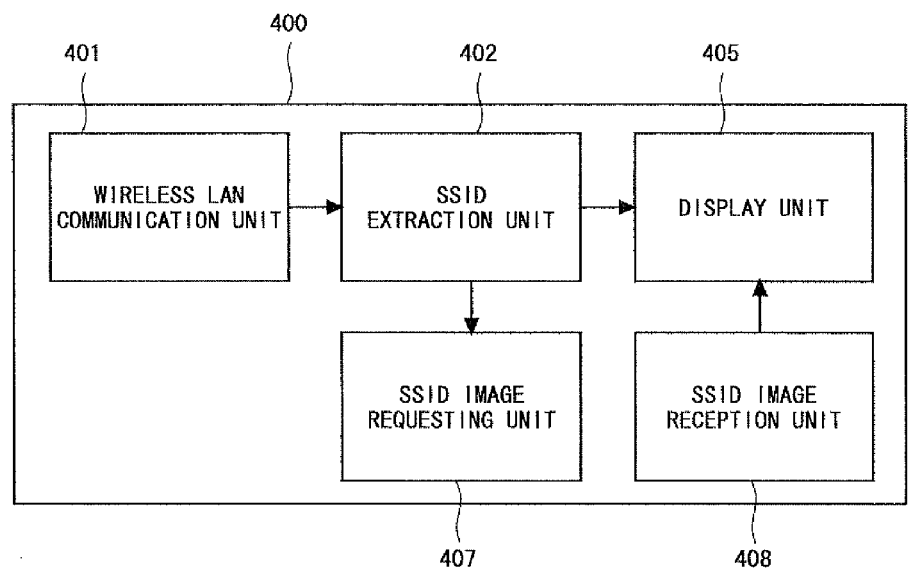
FIG. 15 is a block diagram showing a wireless terminal according to the second exemplary embodiment.

FIG. 15 is a block diagram showing the wireless terminal 400 according to the second exemplary embodiment. The wireless terminal 400 includes the wireless LAN communication unit 401, the SSID extraction unit 402, the display unit 405, an SSID image requesting unit 407, and an SSID image reception unit 408. Since the configurations of the wireless LAN communication unit 401, the SSID extraction unit 402, and the display unit 405 are similar to those of the first exemplary embodiment, the description thereof is omitted.

The SSID image requesting unit 407 requests the external server 600 to transmit the SSID image data, by using the SSID and the image authentication ID which are transmitted from the wireless LAN access point 100.

The SSID image reception unit 408 receives the SSID image data, which has been transmitted from the external server 600, in response to the transmission request from the SSID image requesting unit 407. Next, the operation of the communication system 2 according to the second exemplary embodiment will be described with reference to FIG. 13. First, the wireless LAN access point 100 transmits, to the wireless terminal 400, the SSID and the image authentication ID which are stored in the SSID storage unit 101 (step S301). The wireless LAN access point 100 stores the SSID and the image authentication ID in a beacon frame and transmits the beacon frame.

The SSID extraction unit 402 of the wireless terminal 400 extracts the SSID and the image authentication ID which are included in the received beacon frame. Further, the SSID extraction unit 402 outputs the extracted SSID and image authentication ID to the SSID image requesting unit 407.

Next, the SSID image requesting unit 407 requests the external server 600 to transmit the SSID image data, by using the SSID and the image authentication ID. Specifically, the SSID image requesting unit 407 transmits the SSID and the image authentication ID to the wireless LAN access point 100 (step S302). The wireless LAN access point 100 transmits the received SSID and image authentication ID to the external server 600 (step S303). The transmission request for the SSID image data from the SSID image requesting unit 407 may be sent at a timing when the user has manipulated the wireless terminal 400, or at a timing when the SSID extraction unit 402 has extracted the SSID.

At this time, the wireless terminal 400 may request the external server 600 to transmit the SSID image data, without involving the wireless LAN access point 100. For example, if the wireless terminal 400 is a mobile phone or a smartphone, the wireless terminal 400 may directly request the external server 600 to transmit the SSID image data, by using a mobile phone network (WAN) (step S302').

The external server 600 reads out the SSID image data corresponding to the SSID from a memory by referring to the SSID included in the transmission request for the SSID image data. Further, the external server 600 compares the image authentication ID, which is associated with the read SSID image data, with the image authentication ID included in the transmission request. When the image authentication IDs match each other, the external server 600 transmits the SSID image data corresponding to the transmission request to the wireless LAN access point 100 (step S304).

Upon receiving the SSID image data from the external server 600, the SSID image transmission/reception unit 106 of the wireless LAN access point 100 transmits the SSID image data to the wireless terminal 400 by using a beacon frame, without dividing the SSID image data (step S305).

At this time, the external server 600 may transmit the SSID image data to the wireless terminal 400 without involving the wireless LAN access point 100. In the same manner as described above, the external server 600 may directly transmit the SSID image data to the wireless terminal 400 by using a mobile phone network (step S304').

Upon receiving the SSID image data, the SSID image reception unit 408 of the wireless terminal 400 outputs the SSID image data to the display unit 405. Then the display unit 405 displays the received SSID image as well as the SSID.

As described above, in the configuration of the communication system 2 according to the second exemplary embodiment, the external server 600 existing on the Internet stores the SSID image data. Accordingly, it is not necessary for the wireless LAN access point 100 to store the SSID image data. This eliminates the need for the wireless LAN access point 100 to be provided with a separate memory (corresponding to the SSID image storage unit 102 in the first embodiment) for storing the SSID image data. In other words, the present invention can be applied by changing the processing (software) of the wireless LAN access point 100. As a result, there is no need to change the hardware of the wireless LAN access point 100, resulting in an increase in the versatility of the present invention.

Note that the present invention is not limited to the above exemplary embodiments, and can be modified or combined as appropriate without departing from the scope of the invention. For example, while image data is used as audio-visual data to be transmitted to the wireless terminal 400 in the above exemplary embodiments, audio data and moving image data can also be used. In this case, a speaker or the like is required as output means. Further, the medium for transmitting audio-visual data is not limited to a beacon frame. The present invention can be applied in the case of communications in a format in which the capacity of the frame body is smaller than the data size of original image data, i.e., non-divided image data, and the like.

Figure 16:
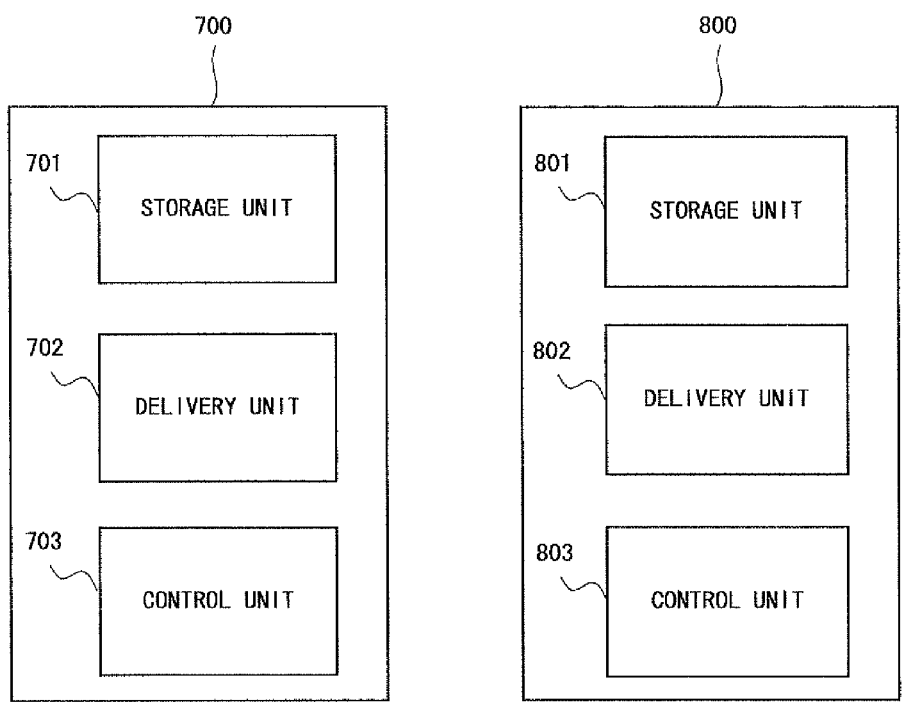
FIG. 16 is a block diagram showing the communication system according to the present invention.

A wireless communication device 700 according to the present invention has at least the components shown in FIG. 16. Specifically, the wireless communication device 700 includes a storage unit 701, a delivery unit 702, and a control unit 703. The storage unit 701 holds identification information indicating the wireless communication device, and related information related to the identification information.

The delivery unit 702 delivers the identification information and the related information in such a manner that the identification information and the related information are included in a wireless beacon. Upon acquisition of a connection request signal based on the delivered identification information, the control unit 703 establishes a wireless communication. An information communication terminal 800 according to the present invention includes a storage unit 801, an output unit 802, and a control unit 803. The storage unit 801 holds identification information and related information related to the identification information, upon acquisition of the identification information and the related information. The control unit 803 establishes a wireless communication based on the identification information, and causes the output unit to output the related information. This configuration allows the wireless communication device 700 to transmit the related information related to the identification information to the information communication terminal. Further, the information communication terminal 800 outputs the related information, thereby enabling the user to recognize the related information. Accordingly, the visibility of the identification information is enhanced, and thus the user can easily identify the wireless LAN (wireless communication device 700).

Any processing of the above-described communication system can also be implemented by causing a CPU (Central Processing Unit) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Not only the case where the functions of the above exemplary embodiments are implemented by causing a computer to execute a program for achieving the functions of the above exemplary embodiments, but also the case where the functions of the above exemplary embodiments are implemented by this program in collaboration with an OS (Operating System) or application software running on the computer is included in exemplary embodiments of the present invention. Furthermore, the case where the functions of the above exemplary embodiments are implemented in such a manner that a function extension board incorporated in a computer, or a function extension unit connected to a computer, executes the whole or part of the processing of this program is also included in exemplary embodiments of the present invention.

According to the present invention, it is possible to provide a wireless communication device, an information communication terminal, a communication system control method, and a control program which are capable of easily identifying a wireless LAN.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1)

A wireless communication device comprising:

a storage unit that holds identification information and related information related to the identification information;

a delivery unit that delivers the identification information indicating the wireless communication device and the related information in such a manner that the identification information and the related information are included in a wireless beacon; and a control unit that establishes a wireless communication upon acquisition of a connection request signal based on the delivered identification information.

(Supplementary Note 2)

The wireless communication device according to Supplementary note 1, wherein the control unit causes the delivery unit to periodically deliver partial information that forms a part of the related information.

(Supplementary Note 3)

The wireless communication device according to Supplementary note 2, wherein the control unit divides the related information into a plurality of pieces of the partial information, and the delivery unit delivers both the identification information and the partial information.

(Supplementary Note 4)

The wireless communication device according to Supplementary note 3, further comprising integration means for integrating the identification information with the partial information, wherein the delivery unit that delivers the beacon information after the integration by the integration means.

(Supplementary Note 5)

A communication system comprising:

a wireless communication device;

an information communication terminal capable of establishing a wireless communication with the wireless communication device; and a server device connected to the information communication terminal via a wider area network (WAN), wherein the server device includes:

a storage unit that holds identification information for identifying the wireless communication device, and related information related to the identification information; and a delivery unit that delivers the identification information and the related information to the information communication terminal via the WAN in such a manner that the identification information and the related information are included in a wireless beacon.

(Supplementary Note 6)

An information communication terminal comprising:

a storage unit that holds identification information and related information related to the identification information, upon acquisition of the identification information and the related information;

an output unit that outputs the related information; and a control unit that establishes a wireless communication based on the identification information and outputs the related information to the output unit.

(Supplementary Note 7)

The information communication terminal according to Supplementary note 6, further comprising construction means for constructing, upon acquisition of partial information, the related information from the partial information, the partial information forming a part of the related information, wherein the control unit outputs the related information to the output unit.

(Supplementary Note 8)

The information communication terminal according to Supplementary note 7, wherein when the storage unit holds related information corresponding to the partial information received by the information communication terminal, the control unit causes the output unit to output the corresponding related information.

(Supplementary Note 9)

The information communication terminal according to Supplementary note 8, wherein when the related information includes display data, the control unit causes the output unit to output the display data.

(Supplementary Note 10)

The information communication terminal according to any one of Supplementary notes 6 to 9, wherein the control unit causes the output unit to output the display data for each category of the wireless communication.

(Supplementary Note 11)

The information communication terminal according to Supplementary note 8, wherein when the related information includes audio data, the control unit causes the output unit to output the audio data.

(Supplementary Note 12)

A method for controlling a communication system, the communication system comprising: a wireless communication device including a storage unit that holds identification information indicating the wireless communication device, and related information related to the identification information; and an information communication terminal capable of establishing a wireless communication with the wireless communication device, the method comprising:

delivering, by the wireless communication device, the identification information and the related information in such a manner that the identification information and the related information are included in a wireless beacon; and establishing, by the wireless communication device, a wireless communication with the information communication terminal upon acquisition of a connection request signal based on the delivered identification information from the information communication terminal.

(Supplementary Note 13)

A non-transitory computer readable medium storing a control program for a communication system, the communication system comprising: a wireless communication device including a storage unit that holds identification information indicating the wireless communication device, and related information related to the identification information; and an information communication terminal capable of establishing a wireless communication with the wireless communication device, the control program causing a computer to execute processing comprising:

causing the wireless communication device to deliver the identification information and the related information in such a manner that the identification information and the related information are included in a wireless beacon; and causing the wireless communication device to establish a wireless communication with the information communication terminal, upon acquisition of a connection request signal based on the identification information from the information communication terminal, the identification information being delivered by the wireless communication device.

What is claimed is:

1. A wireless communication device comprising:
    a storage unit that holds identification information indicating the wireless communication device, and image data related to the identification information;
    a delivery unit that delivers the identification information, the image data, and category information such that the identification information, the image data, and the category information are included in a wireless beacon; and
    a control unit that establishes a wireless communication upon acquisition, from an information communication terminal, of a connection request signal based on the delivered identification information,
    wherein the category information is one of information indicating whether a wireless local area network (LAN) of the wireless communication device is for business use or private use, information indicating whether the wireless LAN is provided for free or for a fee, and information indicating whether a password is required or not,
    image data is output, to an output unit of the information communication terminal, for each category of the wireless LAN of the wireless communication device based on the category information, and
    the image data is specific image data of the identification information indicating the wireless communication device.

2. The wireless communication device according to claim 1, wherein the control unit causes the delivery unit to periodically deliver partial information that forms a part of the image data.

3. The wireless communication device according to claim 2, wherein
    the control unit divides the image data into a plurality of pieces of the partial information, and
    the delivery unit delivers both the identification information and the partial information.

4. The wireless communication device according to claim 3, further comprising an integration unit that integrates the identification information with the partial information,
    wherein the delivery unit delivers beacon information after the integration by the integration unit.

5. An information communication terminal comprising:
    a storage unit that holds identification information indicating a wireless communication device, and image data related to the identification information, upon acquisition of the identification information and the image data;
    an output unit that outputs the image data; and
    a control unit that establishes a wireless communication based on the identification information, and causes the output unit to output the image data,
    wherein the control unit causes the output unit to output the image data for each category of a wireless local area network (LAN) of the wireless communication device based on category information,
    the category information is one of information indicating whether the wireless LAN of the wireless communication device is for business use or private use, information indicating whether the wireless LAN is provided for free or for a fee, and information indicating whether a password is required or not, and
    the image data is specific image data of the identification information indicating the wireless communication device.

6. The information communication terminal according to claim 5, further comprising a construction unit that constructs, upon acquisition of partial information, the image data from the partial information, the partial information forming a part of the image data,
    wherein the control unit causes the output unit to output the image data.

7. The information communication terminal according to claim 6, wherein when the storage unit holds image data corresponding to the partial information received by the information communication terminal, the control unit causes the output unit to output the corresponding image data.

8. A method for controlling a communication system, the communication system including a wireless communication device including a storage unit that holds identification information indicating the wireless communication device, and image data related to the identification information, and an information communication terminal configured to establish a wireless communication with the wireless communication device, the method comprising:
    delivering, by the wireless communication device, the identification information, the image data, and category information such that the identification information, the image data, and the category information are included in a wireless beacon;
    outputting, by the information communication terminal, the image data for each category of a wireless local area network (LAN) of the wireless communication device based on the category information; and
    establishing, by the wireless communication device, a wireless communication with the information communication terminal, upon acquisition of a connection request signal based on the delivered identification information from the information communication terminal,
    wherein the category information is one of information indicating whether the wireless LAN of the wireless communication device is for business use or private use, information indicating whether the wireless LAN is provided for free or for a fee, and information indicating whether a password is required or not, and
    the image data is specific image data of the identification information indicating the wireless communication device.

9. A non-transitory computer readable medium storing a control program for a communication system, the communication system including a wireless communication device including a storage unit that holds identification information indicating the wireless communication device, and image data related to the identification information, and an information communication terminal configured to establish a wireless communication with the wireless communication device, the control program causing a computer to execute processing comprising:
    causing the wireless communication device to deliver the identification information, the image data, and category information such that the identification information, the image data, and the category information are included in a wireless beacon;
    causing the information communication terminal to output the image data for each category of a wireless local area network (LAN) of the wireless communication device based on the category information; and causing the wireless communication device to establish a wireless communication with the information communication terminal, upon acquisition of a connection request signal based on the delivered identification information from the information communication terminal, wherein the category information is one of information indicating whether the wireless LAN of the wireless communication device is for business use or private use, information indicating whether the wireless LAN is provided for free or for a fee, and information indicating whether a password is required or not, and the image data is specific image data of the identification information indicating the wireless communication device.

* * * * *